US010255135B2

United States Patent
Resch et al.

(10) Patent No.: US 10,255,135 B2
(45) Date of Patent: *Apr. 9, 2019

(54) METHOD AND APPARATUS FOR NON-INTERACTIVE INFORMATION DISPERSAL

(71) Applicant: International Business Machines Corporation, Armonk, NY (US)

(72) Inventors: Jason K. Resch, Chicago, IL (US); Ramin Rouzbeh, Wheeling, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,340

(22) Filed: Nov. 28, 2017

(65) Prior Publication Data

US 2018/0089029 A1 Mar. 29, 2018

Related U.S. Application Data

(63) Continuation-in-part of application No. 13/463,991, filed on May 4, 2012, now Pat. No. 9,842,222, and a
(Continued)

(51) Int. Cl.
*H04L 9/06* (2006.01)
*G06F 11/10* (2006.01)
(Continued)

(52) U.S. Cl.
CPC ........ *G06F 11/1092* (2013.01); *G06F 3/0604* (2013.01); *G06F 3/067* (2013.01);
(Continued)

(58) Field of Classification Search
CPC .... H04L 63/20; H04L 63/102; G06F 21/6218
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Grube U.S. Appl. No. 61/299,245, filed Jan. 28, 2010 (Year: 2010).*
(Continued)

*Primary Examiner* — Evans Desrosiers
(74) *Attorney, Agent, or Firm* — Garlick & Markison; Timothy W. Markison; Harry S. Tyson, Jr.

(57) ABSTRACT

Methods and apparatus for use in a dispersed storage network (DSN) to enable non-interactive information dispersal. In various examples, a computing device dispersed storage error encodes a data segment of a data object to produce a set of encoded data slices. Utilizing a secret key, the computing device encrypts an encoded data slice of the set of encoded data slices to produce an encrypted data slice. The computing device also encrypts the secret key, utilizing a public key of a storage unit of the DSN. The encrypted data slice and the encrypted secret key are combined by the computing device to create a package. A signature operation is performed on the package to generate a signed package, which is sent to the DSN storage unit. The signature operation can include generating a hash digest of the package and encrypting the hash digest utilizing a private key of the computing device.

20 Claims, 7 Drawing Sheets

Related U.S. Application Data continuation-in-part of application No. 12/862,887, filed on Aug. 25, 2010, now Pat. No. 8,918,897.

(60) Provisional application No. 61/493,820, filed on Jun. 6, 2011.

(51) Int. Cl.
| | |
|---|---|
| *G06F 11/07* | (2006.01) |
| *H04L 9/08* | (2006.01) |
| *H04L 9/32* | (2006.01) |
| *G06F 3/06* | (2006.01) |
| *G06F 12/14* | (2006.01) |
| *G06F 11/20* | (2006.01) |
| *G06F 21/60* | (2013.01) |
| *G06F 21/62* | (2013.01) |
| *G06F 21/64* | (2013.01) |
| *G06F 15/173* | (2006.01) |

(52) U.S. Cl.
CPC ........ *G06F 3/0644* (2013.01); *G06F 11/0727* (2013.01); *G06F 11/1076* (2013.01); *G06F 11/2089* (2013.01); *G06F 12/1408* (2013.01); *G06F 21/602* (2013.01); *G06F 21/6218* (2013.01); *G06F 21/6227* (2013.01); *G06F 21/64* (2013.01); *H04L 9/0643* (2013.01); *H04L 9/085* (2013.01); *H04L 9/0825* (2013.01); *H04L 9/0861* (2013.01); *H04L 9/3247* (2013.01); *H04L 9/3265* (2013.01); *H04L 9/3297* (2013.01); *G06F 15/17331* (2013.01); *G06F 2212/263* (2013.01); *G06F 2221/2107* (2013.01); *H04L 2209/34* (2013.01)

(58) Field of Classification Search
USPC .......................................................... 713/189
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0138539 A1* | 6/2010 | Neville ................ H04L 45/00 709/226 |
| 2011/0126295 A1 | 5/2011 | Resch |
| 2011/0182424 A1* | 7/2011 | Grube .................. G06F 21/72 380/43 |

OTHER PUBLICATIONS

Chung; An Automatic Data Segmentation Method for 3D Measured Data Points; National Taiwan University; pp. 1-8; 1998.

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Rao; Joint encryption and error correction schemes; Proceedings of the 11th Annual International Symposium on Computer Architecture; ISCA '84; Jan. 1, 1984; pp. 240-241.

Satran, et al.; Internet Small Computer Systems Interface (iSCSI); IETF Network Working Group; RFC 3720; Apr. 2004; pp. 1-257.

(56) References Cited

OTHER PUBLICATIONS

Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): String Representation of Search Filters; IETF Network Working Group; RFC 4515; Jun. 2006; pp. 1-12.
Smith; Lightweight Directory Access Protocol (LDAP): Uniform Resource Locator; IETF Network Working Group; RFC 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

* cited by examiner

METHOD AND APPARATUS FOR NON-INTERACTIVE INFORMATION DISPERSAL

CROSS-REFERENCE TO RELATED APPLICATIONS

The present U.S. Utility patent application claims priority, pursuant to 35 U.S.C. § 120, as a continuation-in-part of U.S. Utility application Ser. No. 13/463,991, entitled "SECURELY REBUILDING AN ENCODED DATA SLICE," filed May 4, 2012, which claims priority pursuant to 35 U.S.C. § 119(e) to U.S. Provisional Application No. 61/493,820, entitled "DATA SECURITY IN A DISPERSED STORAGE NETWORK," filed Jun. 6, 2011, both of which are hereby incorporated herein by reference in their entirety and made part of the present U.S. Utility patent application for all purposes.

U.S. Utility patent application Ser. No. 13/463,991 also claims priority pursuant to 35 U.S.C. § 120 as a continuation-in-part of U.S. Utility application Ser. No. 12/862,887, entitled "DISPERSED STORAGE NETWORK DATA SLICE INTEGRITY VERIFICATION," filed Aug. 25, 2010, now U.S. Pat. No. 8,918,897, which is hereby incorporated by reference in its entirety and made part of the present U.S. Utility patent application for all purposes.

BACKGROUND

This invention relates generally to computer networks, and more specifically, to dispersal of information in a dispersed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

SUMMARY

According to an embodiment of the present invention, a data segment of a data object is dispersed storage error encoded to produce a set of encoded data slices. Utilizing a secret key, an encoded data slice of the set of encoded data slices is encrypted to produce an encrypted data slice. The secret key is also encrypted utilizing a public key of a storage unit of a dispersed storage network (DSN). The encrypted data slice and the encrypted secret key are combined to create a package. A signature operation is performed on the package to generate a signed package, which is sent to the storage unit of the DSN. The signature operation can include generating a hash digest of the package and encrypting the hash digest utilizing a private key.

DETAILED DESCRIPTION

Figure 1:
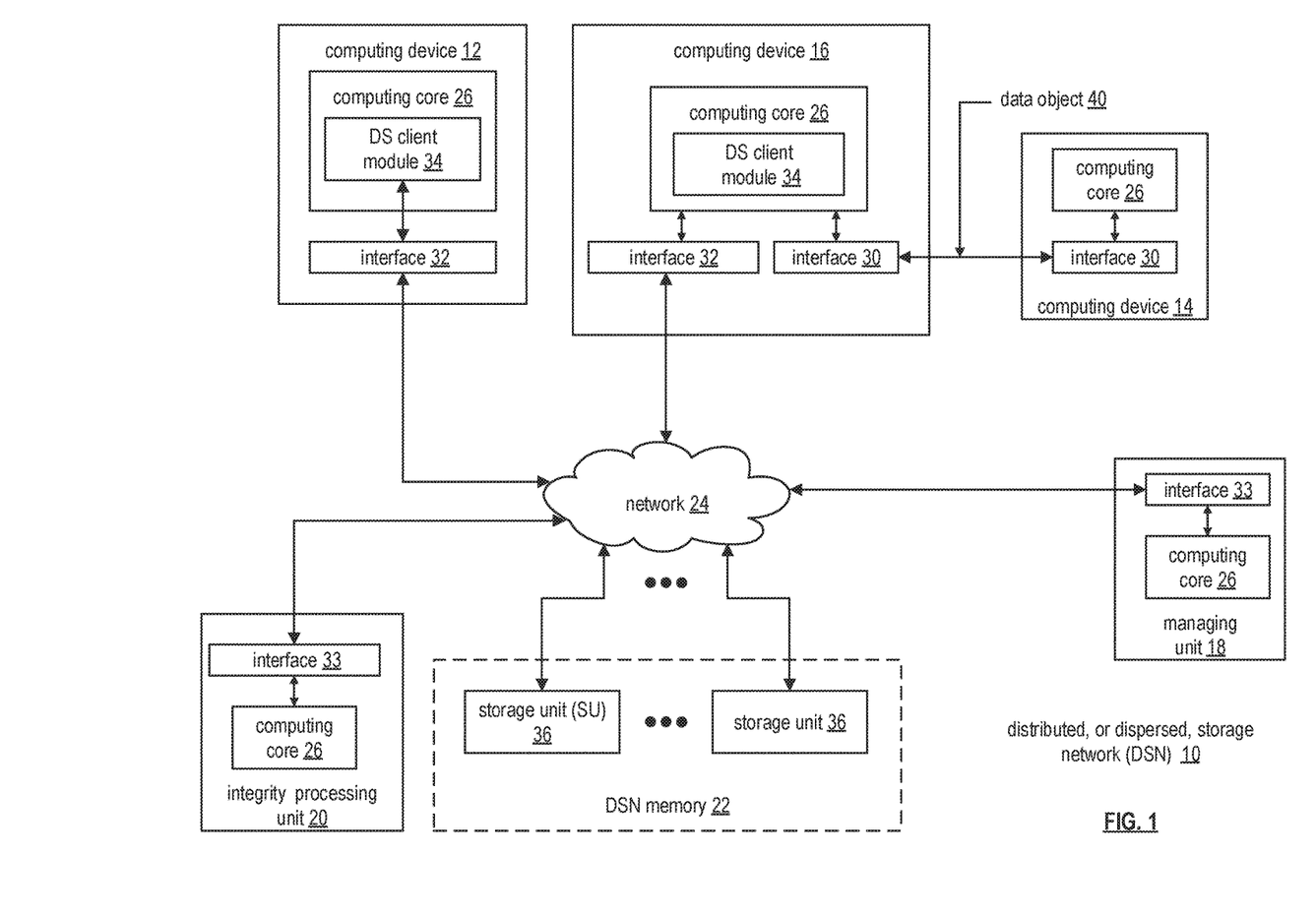
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
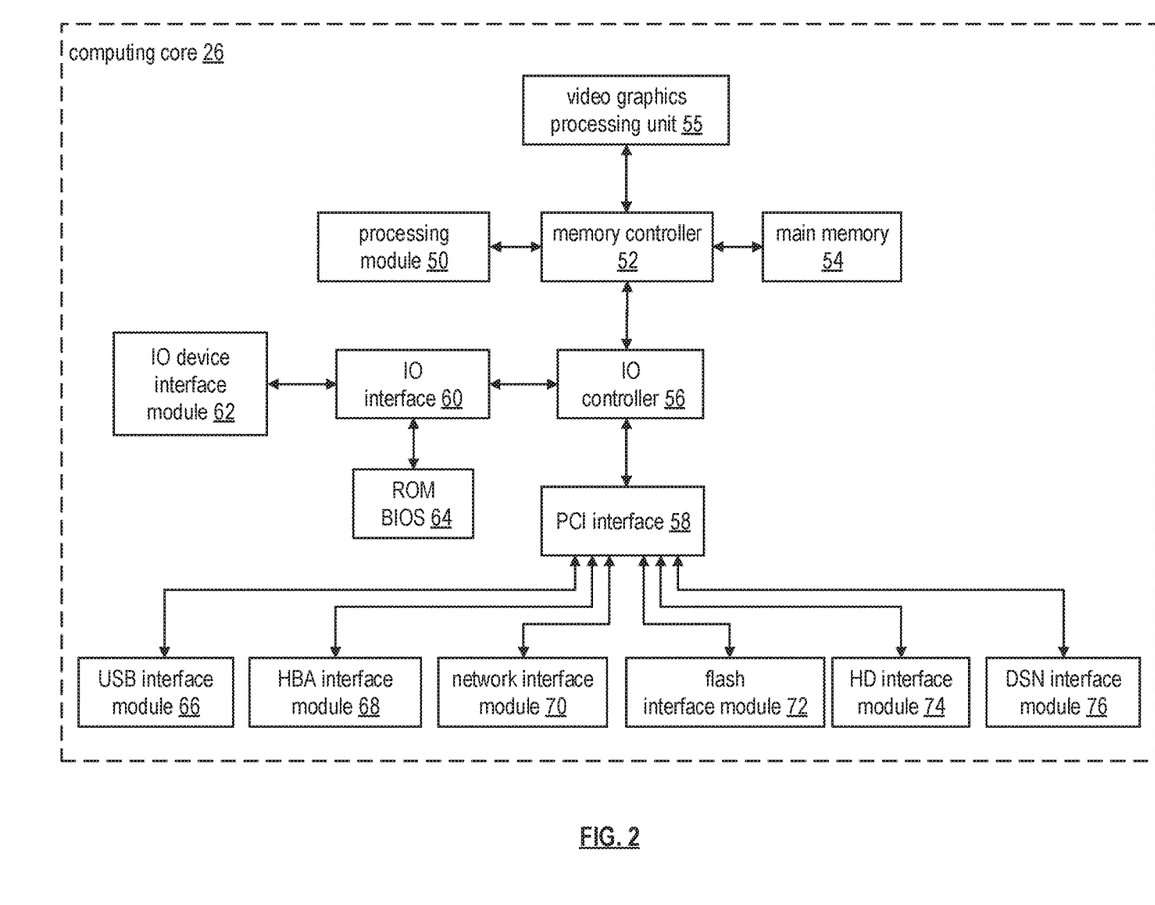
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more than or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, integrity processing unit 20 and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of load balancing, service differentiation and dynamic resource selection for data access operations are discussed in greater detail with reference to FIGS. 9-13.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
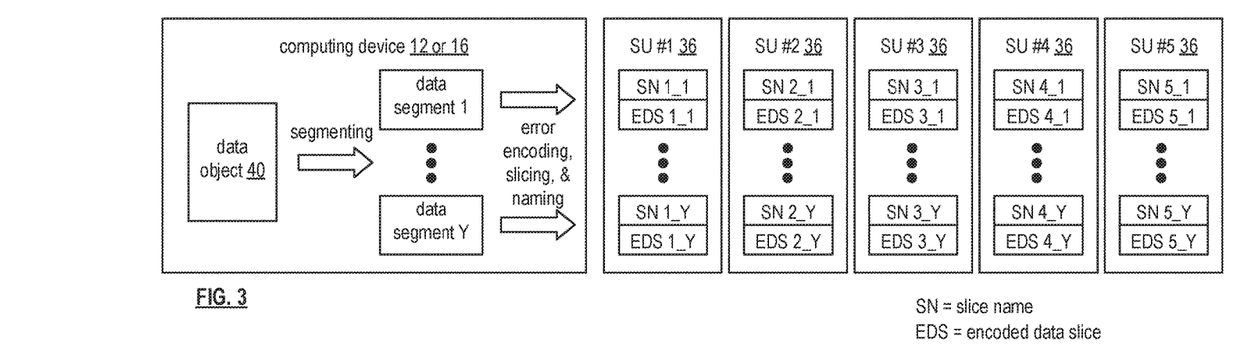
FIG. 3 is a schematic block diagram of an example of dispersed storage error encoding of data in accordance with the present disclosure.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 4:
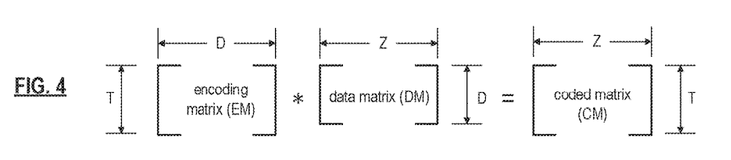
FIG. 4 is a schematic block diagram of a generic example of an error encoding function in accordance with the present disclosure.
Figures 5, 6:
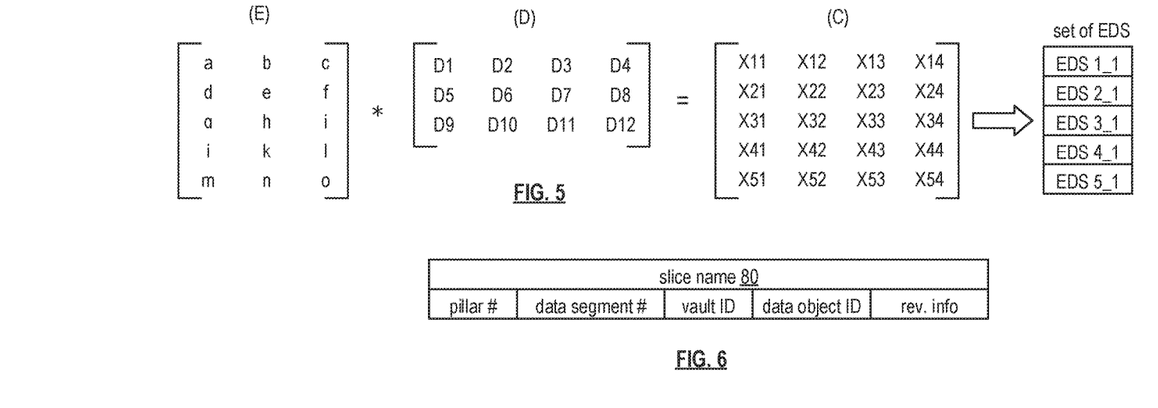
FIG. 5 is a schematic block diagram of a specific example of an error encoding function in accordance with the present disclosure.
FIG. 6 is a schematic block diagram of an example of slice naming information for an encoded data slice (EDS) in accordance with the present disclosure.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
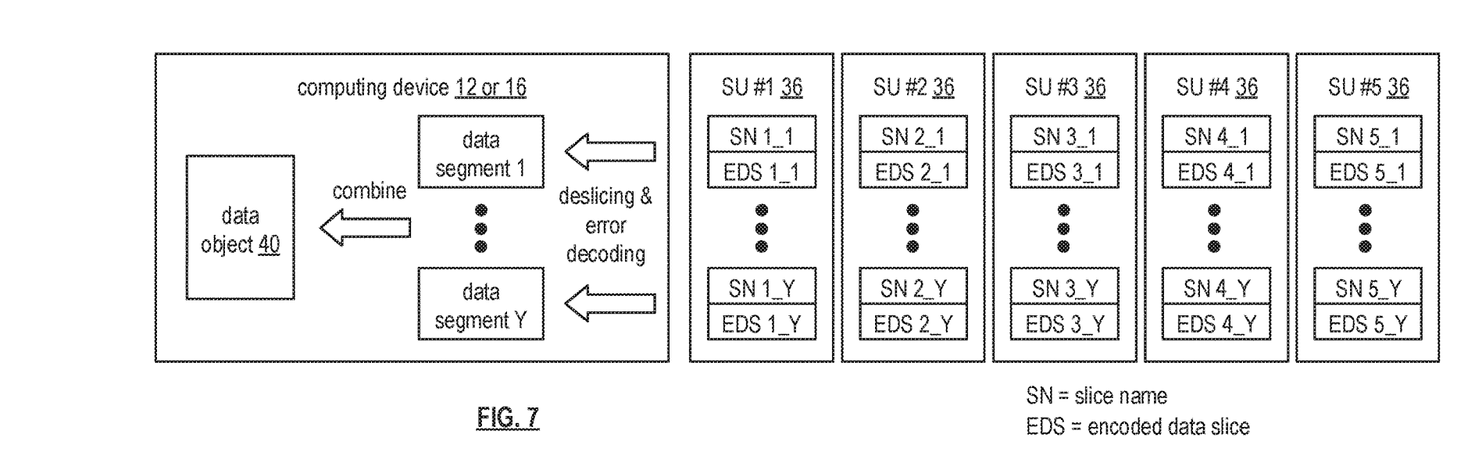
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
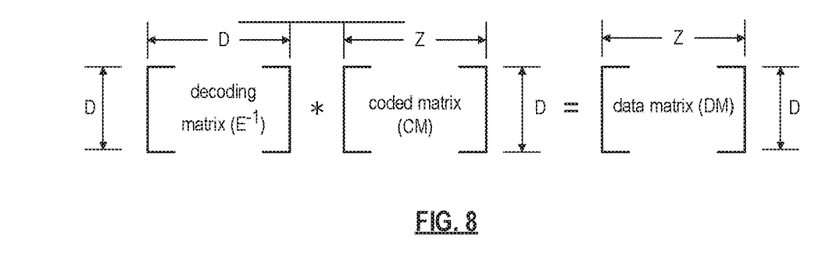
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

As described more fully below in conjunction with the novel examples of FIGS. 9A, 9B, 10A and 10B, a protocol is provided for securely dispersing information to storage units in a manner applicable to (but not limited to) one-way communication paths. For example, it may be impossible, undesirable, or involve too much latency for storage units to perform two-way communications (e.g., to send an acknowledgement confirming successful receipt of a dispersed data). Such storage units might be included, for example, in satellites, submarines, entities under radio silence, deep space probes, etc.

Briefly, in certain embodiments a computing device receives data to disperse, and produces a set of encoded data slices from the data. The computing device also determines the identity of one or more target recipients of the encoded data slices, and obtains a digital certificate/public key for each target recipient from a local or remote database. For each encoded data slice, the computing device generates or obtains a secret key and utilizes the secret key to encrypt the encoded data slice. The computing device further encrypts the secret key utilizing a public key of the target recipient of the encoded data slice. The computing device then creates a package that includes the encrypted data slice, encrypted secret key, a timestamp, a sequence number associated with the data slice, a requester identity (ID), and/or an operational code associated with the slice. The package is then signed by the computing device (e.g., using a public key of the target recipient) and sent to the target recipient.

Figure 9A:
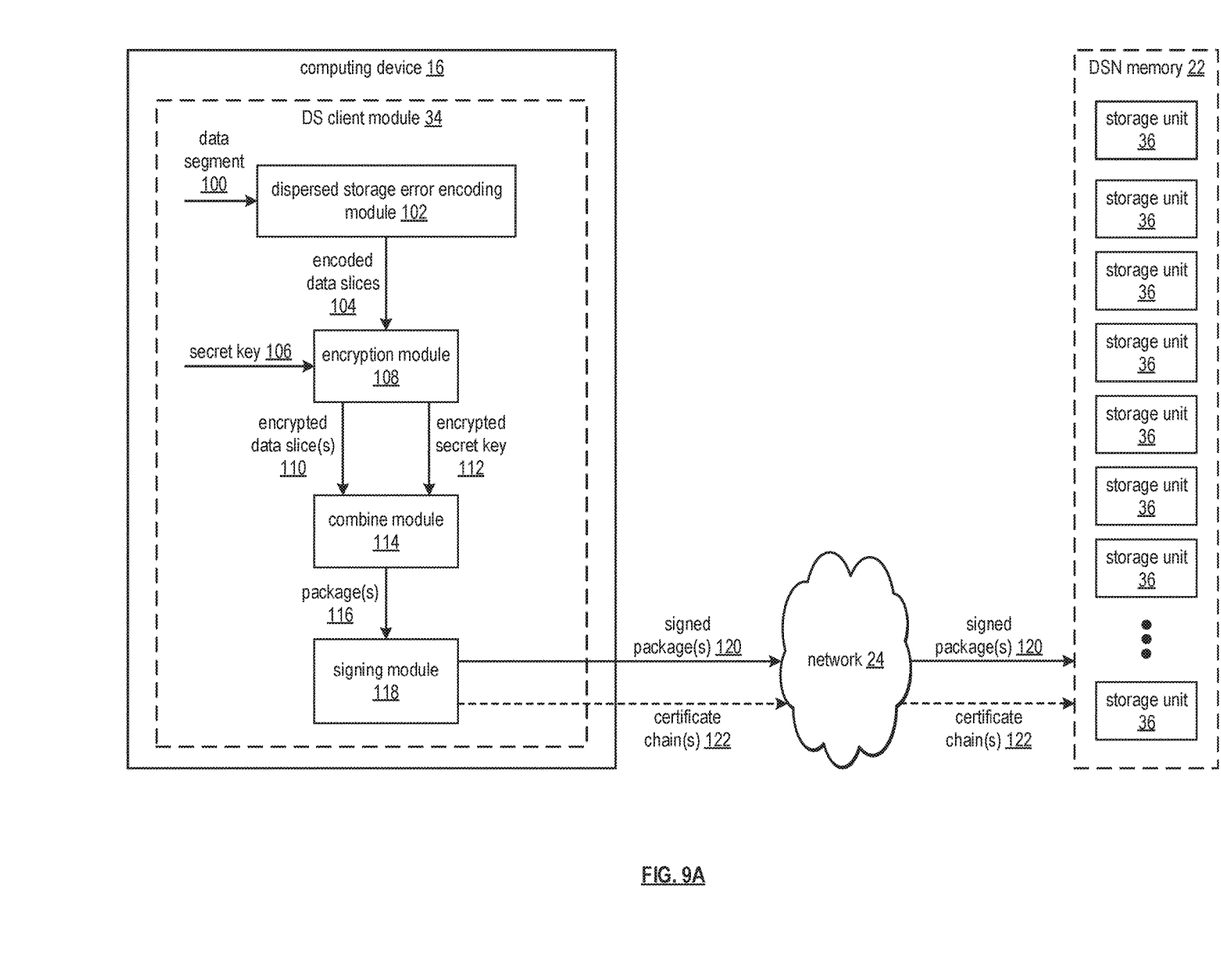
FIG. 9A is a schematic block diagram of a DSN performing encryption of encoded data in accordance with an embodiment of the present disclosure.

Referring now to FIG. 9A, a schematic block diagram of a DSN performing encryption of encoded data in accordance with an embodiment of the present disclosure is shown. The illustrated DSN includes a computing device 16, DSN memory 22, and the network 24 of FIG. 1. The illustrated DSN memory 22 includes a set of storage units 36 (where, for example, 1-n storage units is in a set and n is an integer greater than or equal to three). Each storage unit 36 may be implemented utilizing the storage unit 36 of FIG. 1, and each of the storage units 36 includes a DS client module 34/processing module and memory (not separately illustrated). The storage units 36 of a storage set may be located at a same physical location (site) or located at multiple physical locations without departing from the technology as described herein.

In general, DSN memory 22 stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

The computing device 16 includes a DS client module 34 configured to generate signed packages 120 that include encoded data slices 104 for storage in DSN memory 22, such as described below in conjunction with FIG. 10A. In the illustrated example, the DS client module 34 includes a dispersed storage error encoding module 102, and encryption module 108, a combine module 114, and a signing module 118. In operation, the dispersed storage error encoding module 102 receives and encodes a data segment 100 to produce a set of encoded data slices 104. The encryption module 108 encrypts one or more of the encoded data slices 104 utilizing a secret key 106 to produce an encrypted data slice(s) 110. The secret key 106 may be obtained, for example, by retrieving it from a local or remote database, by generating a random secret key, by generating the secret key based on a deterministic function such as a hash function, etc.

The encryption module 108 further encrypts the secret key 106 to produce an encrypted secret key 112. In an example, the secret key 106 is encrypted with a public key of a public/private key pair associated with a target entity (e.g., a receiving storage unit 36 of DSN memory 22).

The combining module 114 receives and combines an encrypted data slice 110 and the encrypted to create a package 116. The package 116 may further include a timestamp, a sequence number associated with the encoded data slice and/or package, a requester identity (ID), and/or an operational code or "opcode" (e.g., write request, checked write request, delete request). The package 116 is signed by signing module 118 to create a signed package 120 that is sent, via network 24, to a storage unit 36 of DSN memory 22. In an example, the signing module 118 generates a hash digest of the package, and encrypts the hash digest utilizing a private key of a public/private key pair associated with the computing device 16. In this example, a certificate chain 122 is also sent to the storage unit 36 via network 24 to validate a public key associated with the computing device 16 and used to verify the signed package 120.

Figure 9B:
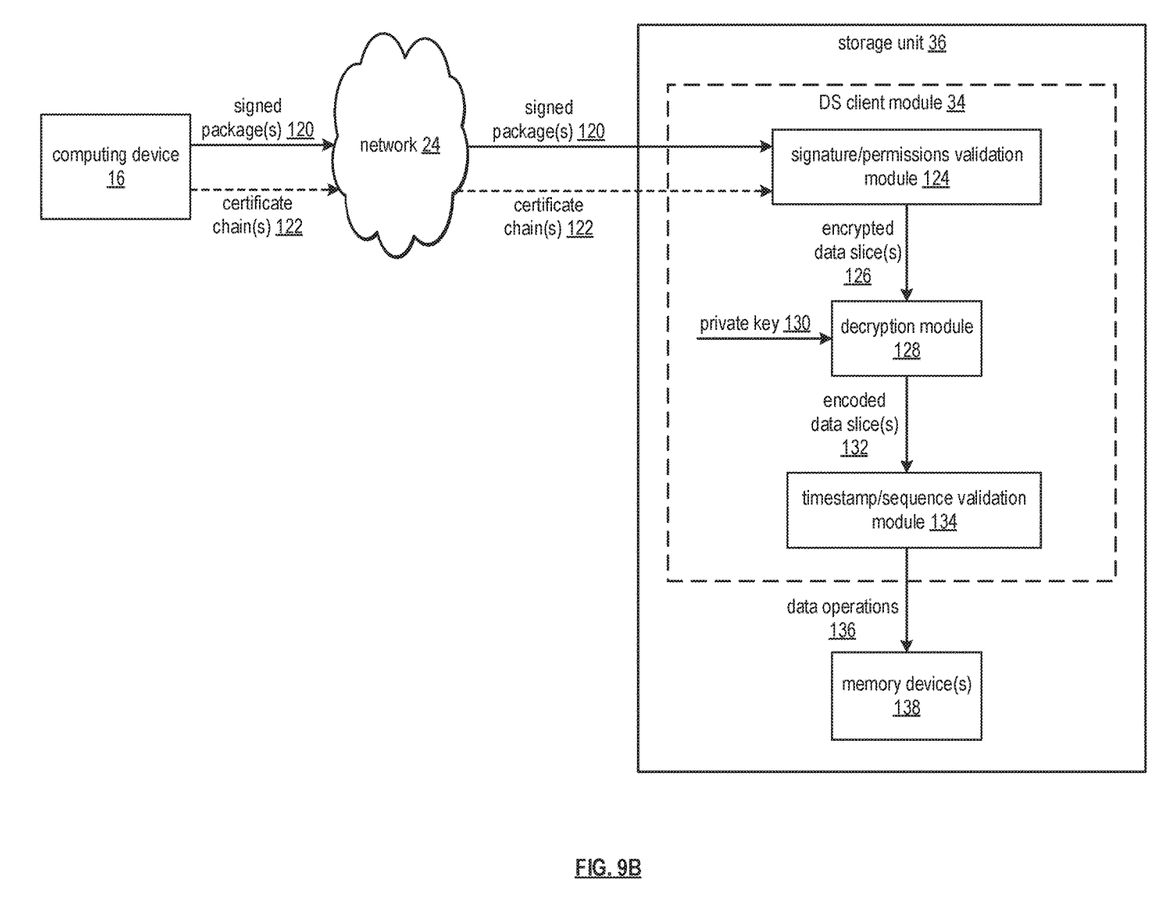
FIG. 9B is a schematic block diagram of another DSN performing decryption of encoded data in accordance with an embodiment of the present disclosure.

FIG. 9B is a schematic block diagram of another DSN performing decryption of encoded data in accordance with an embodiment of the present disclosure. The illustrated DSN includes the computing device 16 of FIG. 9A, the network 24 of FIG. 1, and a storage unit 36 receiving (via network 24) a signed package 120 and, optionally, a certificate chain 122. The storage unit 36 includes a DS client module 34 configured to validate and decrypt the signed package 120, such as described below in conjunction with FIG. 10B, and one or more memory devices 138 for storing dispersed storage error encoded data.

In the illustrated example, DS client module 34 includes a signature/permissions validation module 124, a decryption module 128, and a timestamp/sequence validation module 134. In operation, the signature/permissions validation module 124 receives the signed package 120 and validates the associated signature (e.g., utilizing the certificate chain 122). For example, the signature/permissions validation module 124 decrypts the signature utilizing a public key associated with a sender of the signed package and then compares the decrypted signature to a calculated hash digest of the package. If the comparison is favorable (e.g., the decrypted signature is substantially the same as the calculated hash digest), the signature is validated. The signature/permissions validation module 124 of this example may further validate permissions associated with the signed package. For example, the processing module compares a requester identity (ID) and an opcode (both of which may be part of the signed package 120) to a list of permitted operations associated with the requester ID. When the signature and permissions are valid, the signature/permissions validation module 124 forwards an encrypted data slice 126, of the signed package 120, to the decryption module 128.

The decryption module 128 utilizes a private key 130 to decrypt an encrypted secret key included in the signed package 120. The private key 130 may correspond to a public key used by computing device 16 in generating the signed package 120. The decryption module 128 further utilizes the decrypted secret key to decrypt the encrypted data slice 126 and recover and encoded data slice 132.

The encoded data slice 132 and associated information is provided to timestamp/sequence validation module 134, which operates, for example, to verify that a sequence number of the encoded data slice 132 compares favorably to a previous or expected sequence number. As another example, the timestamp/sequence validation module 134 verifies that a timestamp associated with the encoded data slice 132 compares favorably to (e.g., is greater/lesser than) at least one of a previous timestamp and a current timestamp. The difference between the timestamp and a current time may be calculated, for example, and if the difference exceeds a predetermined amount of time, the encoded data slice 132 may be discarded as stale. If the signed package 120 and encrypted data slice 126 are successfully validated/decrypted, the DS client module 34 may facilitate one or more data operations 136 (e.g., a write operation to memory device 138, a checked write operation, a delete operation, etc.) involving the encoded data slice 132 in accordance with a validated opcode of the signed package 120.

Figure 10A:
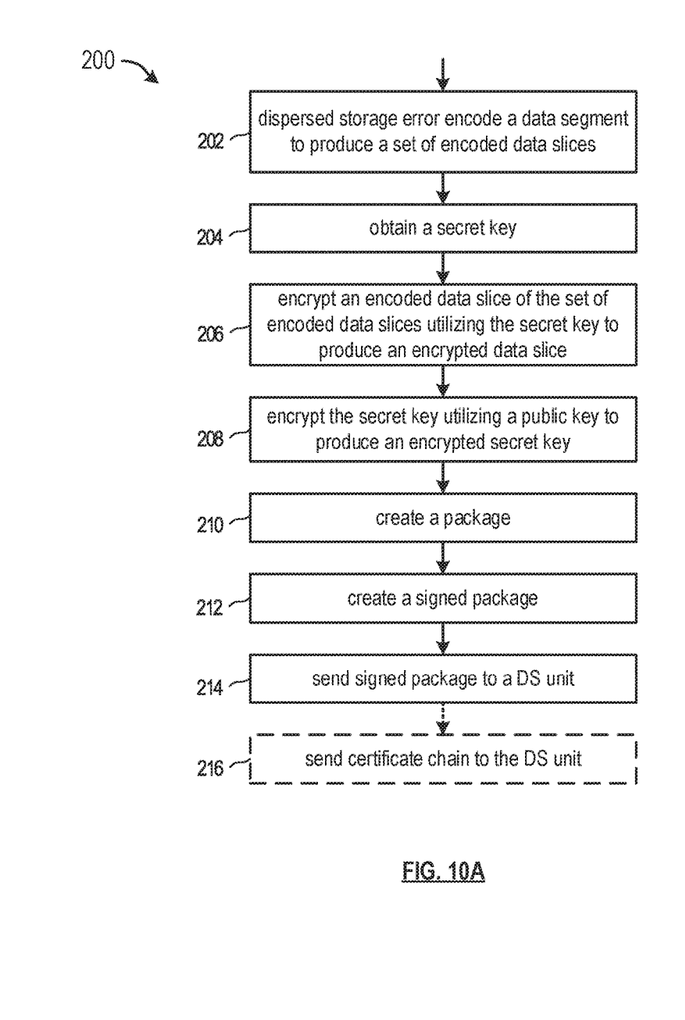
FIG. 10A is a flow diagram illustrating an example of encrypting an encoded data slice in accordance with an embodiment of the present disclosure.

FIG. 10A is a flow diagram 200 illustrating an example of encrypting an encoded data slice in accordance with an embodiment of the present disclosure. The method begins at step 202 where a processing module (e.g., of a computing device 16) dispersed storage error encodes a data segment of a data object to produce a set of encoded data slices for storage in a dispersed storage network (DSN) memory. The method continues at step 204 where the processing module obtains a secret key (e.g., retrieving the secret key, generating a random secret key, generating the secret key based on a deterministic function such as a hash function, etc.).

The method continues at step 206 where the processing module encrypts an encoded data slice of the set of encoded data slices utilizing the secret key. The method continues at step 208 where the processing module obtains a public key from a public/private key pair associated with a target entity (e.g., a receiving storage unit), and encrypts the secret key utilizing the public key.

The method continues at step 210 where the processing module creates a package that includes the encrypted data slice and the encrypted secret key. The package may further include a timestamp, a sequence number associated with the data slice and/or package, a requester identity (ID), and/or an operational code or "opcode" (e.g., write request, checked write request, delete request). Creating the package may include combining (e.g., linking, attaching, appending and/or interlacing) various such package elements to produce the package. The method continues at step 212 where the processing module creates a signed package (e.g., signs the package using a secure digital signature). For example, the processing module generates a hash digest (e.g., performs a hash function) of the package, and encrypts the hash digest utilizing a private key of a public/private key pair associated with the processing module to produce the signature.

The method continues at step 214 where the processing module sends (e.g., broadcasts) the signed package to a storage unit to facilitate storage of the encoded data slice. The method continues at step 216 where the processing module optionally sends a certificate chain (e.g., validating a public key associated with the private key used to sign the package) to the storage unit. For example, the processing module sends the certificate chain once per batch of sending a plurality of signed packages to the storage unit. As another example, the processing module sends the certificate chain to the storage unit with each signed package. Further, one or more steps of the method of FIG. 10A may be repeated for each storage unit of a set of storage units associated with the set of encoded data slices.

Figure 10B:
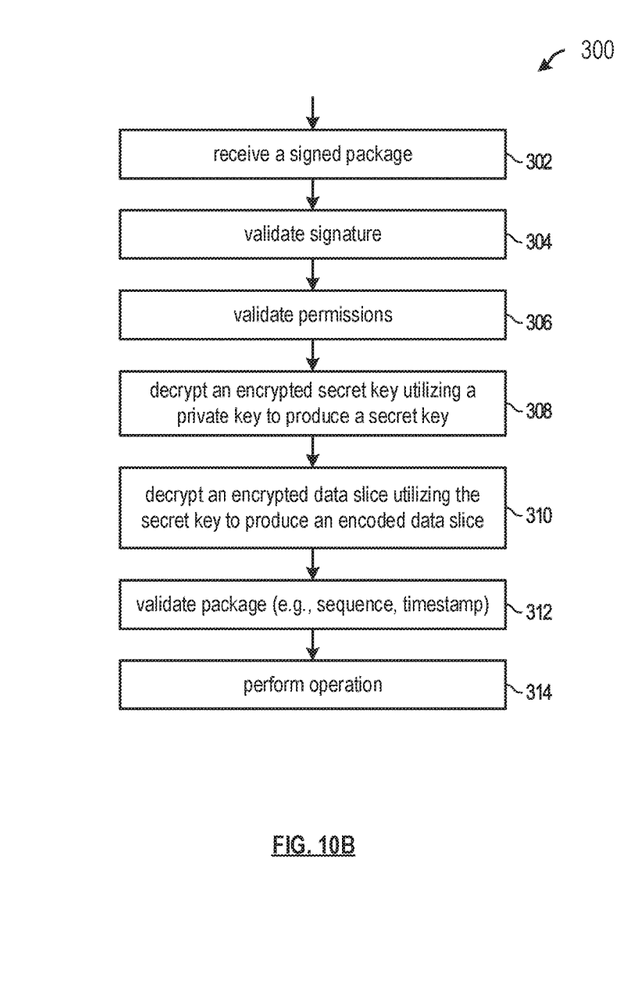
FIG. 10B is a flow diagram illustrating an example of decrypting an encoded data slice in accordance with an embodiment of the present disclosure.

FIG. 10B is a flow diagram 300 illustrating an example of decrypting an encoded data slice in accordance with an embodiment of the present disclosure. The method begins at step 302 where a processing module (e.g., of a storage unit 36) receives a signed package and may further receive a certificate chain. The method continues at step 304 where the processing module validates a signature of the signed package. For example, the processing module decrypts the signature utilizing a public-key associated with a sender of the signed package and then compares the decrypted signature to a calculated hash digest of the package. If the comparison is favorable (e.g., the decrypted signature is substantially the same as the calculated hash digest), the signature is validated. Alternatively, or in addition to, the processing module validates the sender's public key when a certificate chain is received.

The method continues at step 306 where the processing module validates permissions associated with the signed package. For example, the processing module compares a requester identity (ID) and an opcode to a list of permitted operations associated with the requester ID. When the signature and permissions are valid (or if step 306 is performed at a later point in time), the method continues at step 308 where the processing module decrypts an encrypted secret key utilizing a private key to recapture the secret key. Note that the private key may be associated with a public/private key pair of the processing module (e.g., for a current storage unit).

The method continues at step 310 where the processing module decrypts an encrypted data slice utilizing the secret key to recapture the encoded data slice. The method continues at step 312 where the processing module validates the package. For example, the processing module verifies that a sequence number of the package/encoded data slice compares favorably (e.g., greater than) to a previous sequence number, and that the package is not a duplicate of a previously received package. As another example, processing module verifies that a timestamp of the package compares favorably to (e.g., is greater/lesser than) at least one of a previous timestamp and a current timestamp. The difference between the timestamp and a current time may be calculated, for example, and if the difference exceeds a predetermined amount of time T, the package is discarded as stale.

The method continues at step 314 where the processing module performs an operation (e.g., write operation, checked write operation, delete operation, etc.) in accordance with and/or indicated by an opcode of the package when the package is validated. For example, the processing module causes an encoded data slice of the package to be stored in a local memory device(s) or otherwise utilized in dispersed storage operations.

The methods described above in conjunction with the computing device 16 and storage units 36 can alternatively be performed by other modules (e.g., DS client modules 34) of a dispersed storage network or by other devices (e.g., managing unit 18). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions/program instructions can, when executed by one or more processing modules of one or more computing devices and/or by the storage units of the dispersed storage network (DSN), cause the one or more computing devices and/or the storage units to perform any or all of the method steps described above.

As may be used herein, the term "substantially" provides an industry-accepted tolerance for its corresponding term and/or relativity between items. Such an industry-accepted tolerance ranges from less than one percent to fifty percent. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagrams, can be implemented by special purpose hardware-based systems that perform the specified functions or acts or carry out combinations of special purpose hardware and computer instructions.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be one or more tangible devices that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
   dispersed storage error encoding a data segment of a data object to produce a set of encoded data slices;
   obtaining a secret key;
   encrypting an encoded data slice of the set of encoded data slices, utilizing the secret key, to produce an encrypted data slice;
   encrypting the secret key, utilizing a public key of a storage unit, to produce an encrypted secret key;
   combining the encrypted data slice and the encrypted secret key to create a package;
   performing a signature operation on the package to generate a signed package;
   sending the signed package for receipt by the storage unit;
   receiving, by the storage unit, the signed package;
   validating a signature of the signed package;
   decrypting the encrypted secret key, utilizing a private key of the storage unit, to produce the secret key; and
   decrypting the encrypted data slice, utilizing the secret key, to produce the encoded data slice.

2. The method of claim 1, wherein obtaining a secret key includes at least one of: retrieving the secret key from a database; generating a random key; or generating the secret key based on a deterministic function.

3. The method of claim 1, wherein performing a signature operation on the package includes:
   generating a hash digest of the package; and
   encrypting the hash digest of the package utilizing a private key associated with the one or more processing modules.

4. The method of claim 3 further comprises:
   sending, for receipt by the storage unit, a certificate chain identifying a public key associated with the private key.

5. The method of claim 1, wherein combining the encrypted data slice and the encrypted secret key to create a package further includes combining at least one of a requester identity (ID) or an operational code associated with the encoded data slice to create the package.

6. The method of claim 1, wherein combining the encrypted data slice and the encrypted secret key to create the package further includes combining at least one of a timestamp or a sequence number to create the package.

7. The method of claim 1 further comprises:
   determining a requester identity and an operational code associated with the package;
   validating that the requester identity is permitted to perform a request associated with the operational code; and
   validating the package based on at least one of a timestamp or a sequence number.

8. The method of claim 1 further comprises:
   performing, on the encoded data slice, an operation indicated by an operational code associated with the encoded data slice.

9. A computer program product comprising a computer readable storage medium having program instructions embodied therewith, the program instructions executable by one or more processing modules to cause the one or more processing modules to:
   dispersed storage error encode a data segment of a data object to produce a set of encoded data slices;
   obtain a secret key;
   encrypt an encoded data slice of the set of encoded data slices, utilizing the secret key, to produce an encrypted data slice;
   encrypt the secret key, utilizing a public key of a storage unit, to produce an encrypted secret key;
   combine the encrypted data slice and the encrypted secret key to create a package;
   perform a signature operation on the package to generate a signed package;
   send the signed package for receipt by the storage unit;
   receive, by the storage unit, the signed package;
   validate a signature of the signed package;
   decrypt the encrypted secret key, utilizing a private key of the storage unit, to produce the secret key; and
   decrypt the encrypted data slice, utilizing the secret key, to produce the encoded data slice.

10. The computer program product of claim 9, wherein obtaining a secret key includes at least one of: retrieving the secret key from a database; generating a random key; or generating the secret key based on a deterministic function.

11. The computer program product of claim 9, wherein performing a signature operation on the package includes:
    generating a hash digest of the package; and
    encrypting the hash digest of the package utilizing a private key associated with the one or more processing modules.

12. The computer program product of claim 11, the program instructions further executable to cause the one or more processing modules to:
    send, for receipt by the storage unit, a certificate chain identifying a public key associated with the private key.

13. The computer program product of claim 9, wherein combining the encrypted data slice and the encrypted secret key to create a package further includes combining at least one of a requester identity (ID) or an operational code associated with the encoded data slice to create the package.

14. The computer program product of claim 9, wherein combining the encrypted data slice and the encrypted secret key to create the package further includes combining at least one of a timestamp or a sequence number to create the package.

15. A computing device comprises:
    a network interface;
    a memory storage comprising instructions; and
    a processing module in communication with the memory, wherein the processing module executes the instructions to:
        dispersed storage error encode a data segment of a data object to produce a set of encoded data slices;
        obtain a secret key;
        encrypt an encoded data slice of the set of encoded data slices, utilizing the secret key, to produce an encrypted data slice;
        encrypt the secret key, utilizing a public key of a storage unit, to produce an encrypted secret key for decryption and recapture by the storage unit;
        combine the encrypted data slice and the encrypted secret key to create a package;
        perform a signature operation on the package to generate a signed package for validation by the storage unit; and
        send, via the network interface, the signed package for receipt by the storage unit wherein the storage unit operates to determine a requester identity and an operational code associated with the signed package and validates that the requester identity is permitted to perform a request associated with the operational code.

16. The computing device of claim 15, wherein obtaining a secret key includes at least one of: retrieving the secret key from a database; generating a random key; or generating the secret key based on a deterministic function.

17. The computing device of claim 15, wherein performing a signature operation on the package includes:
    generating a hash digest of the package; and
    encrypting the hash digest of the package utilizing a private key associated with the one or more processing modules.

18. The computing device of claim 17, wherein the processing module further executes the instructions to:
    send, via the network interface, a certificate chain identifying a public key associated with the private key.

19. The computing device of claim 15, wherein combining the encrypted data slice and the encrypted secret key to create a package further includes combining at least one of a requester identity (ID) or an operational code associated with the encoded data slice to create the package.

20. The computing device of claim 15, wherein combining the encrypted data slice and the encrypted secret key to create the package further includes combining at least one of a timestamp or a sequence number to create the package.

* * * * *